(12) United States Patent
Cermak

(10) Patent No.: US 8,070,613 B2
(45) Date of Patent: Dec. 6, 2011

(54) CONNECTING ASSEMBLY BETWEEN A SHAFT JOURNAL AND A CONSTANT VELOCITY JOINT

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 103 days.

(21) Appl. No.: 12/371,219

(22) Filed: Feb. 13, 2009

(65) Prior Publication Data

US 2009/0209355 A1  Aug. 20, 2009

(30) Foreign Application Priority Data

Feb. 14, 2008  (DE) .................. 10 2008 009 359

(51) Int. Cl.
*F16C 3/00*  (2006.01)
(52) U.S. Cl. .................. 464/182; 464/906; 464/145
(58) Field of Classification Search .................. 464/906, 464/145, 182; 403/342
See application file for complete search history.

(56) References Cited

U.S. PATENT DOCUMENTS

| 4,383,799 A | 5/1983 | Okano et al. | |
| 2007/0149298 A1* | 6/2007 | Wormsbaecher | 464/145 |
| 2007/0191121 A1* | 8/2007 | Zierz et al. | 464/145 |
| 2008/0107477 A1* | 5/2008 | Cermak | 403/1 |
| 2008/0293500 A1* | 11/2008 | Hahn et al. | 464/146 |

FOREIGN PATENT DOCUMENTS

| DE | 1118012 B | 11/1961 |
| DE | 078 09 284 U1 | 10/1978 |
| DE | 197 04 729 A1 | 8/1998 |
| DE | 10 2004 048 079 | 4/2006 |
| DE | 10 2006 012 031 A1 | 9/2006 |
| FR | 940797 A | 12/1948 |
| WO | WO 2006037389 A1 * | 4/2006 |

* cited by examiner

*Primary Examiner* — Aaron Dunwoody
(74) *Attorney, Agent, or Firm* — Rader, Fishman & Grauer, PLLC

(57) ABSTRACT

A connecting assembly for use in the propeller shaft of a motor vehicle is disclosed. The connecting assembly comprises a shaft journal with an annular groove; a constant velocity universal joint with an inner joint part which is connected in a rotationally fixed way to the shaft journal for the purpose of transmitting torque; an axial securing ring for the inner joint part, which axial securing ring is positioned in the annular groove of the shaft journal; and a holding ring which is releasably connected to the inner joint part; wherein, in a mounted condition of the inner joint part, the axial securing ring is axially fixed on the shaft journal between a contact face of the inner joint part and the holding ring connected to the inner joint part.

24 Claims, 4 Drawing Sheets

CONNECTING ASSEMBLY BETWEEN A SHAFT JOURNAL AND A CONSTANT VELOCITY JOINT

CROSS-REFERENCE TO RELATED APPLICATIONS

This application claims benefit of German Application Serial No. 10 2008 009 359.9, which was filed on Feb. 14, 2008 which application is incorporated herein by reference in its entirety.

TECHNICAL FIELD

The disclosure relates to a connecting assembly between a shaft journal and a constant velocity universal joint, more particularly in the driveline shaft of a motor vehicle.

BACKGROUND

A constant velocity universal joint comprises an outer joint part connectable to a driveshaft for example, an inner joint part, which is engaged by a shaft journal for transmitting torque, as well as torque transmitting elements which are effective between the outer joint part and the inner joint part. The shaft journal can be axially and radially fixed in a drive, such as a transmission or an axle differential, with the constant velocity universal joint then being arranged at one end of a propeller shaft. The shaft journal can also be radially elastically supported in an elastic intermediate bearing, with the constant velocity universal joint then being used as the central joint of a two-part propeller shaft.

DE 2004 048 079 discloses a connecting assembly between a constant velocity universal joint arranged at an end of a propeller shaft and an axially fixed shaft journal of a drive. By means of longitudinal splines, the shaft journal engages an inner joint part of the constant velocity universal joint in a rotationally fixed way. The propeller shaft comprises a threaded portion on to which there is threaded a threaded sleeve. The threaded sleeve engages a threaded recess of the inner joint part, with a securing ring being arranged in the threaded recess axially fixing the inner joint part relative to the threaded sleeve.

Overall, connecting a constant velocity universal joint to a driveshaft is complicated because there is available only a limited amount of space and the final assembly stage is also complicated. At the same time, the connecting assembly between the constant velocity universal joint and the shaft journal is subject to optimum safety regulations to prevent disconnection and to ensure a minimum of adverse effects on the strength of the components.

SUMMARY

According to an embodiment, an axial securing ring is provided in the form of a snap ring which is not continuously closed and which form-fittingly and positively engages an annular groove of a shaft journal. To prevent the snap ring from being lifted out of the annular groove when subjected to axial forces, the snap ring is surrounded by a continuous wall of an inner joint part or of a holding ring, which wall prevents the snap ring from widening. The snap ring may comprise a round profile, but other cross-sections, too, like an oval, rectangular or trapezoidal cross-section, are also conceivable. The strength of the shaft journal may be enhanced if, in a cross-sectional view, the depth of the annular groove containing the axial securing ring is smaller than half the radial extension of the axial securing ring. In this way, a cross-sectional reduction of the shaft journal has been reduced to a minimum, so that the shaft strength has been increased, which may extend the service life of the journal.

According to one embodiment, the holding ring is provided in the form of a union nut having an inner thread which is threaded on to a corresponding outer thread of the inner joint part, wherein the axial securing ring is axially held between a contact face in a base portion of the union nut and a contact face of the inner joint part, which contact face, more particularly, is the end face of the inner joint part. When the union nut is tightened, the connection between the inner joint part and the shaft journal is preferably free from any axial play. This is advantageous in that a relative rotational micro-movement between the inner joint part and the shaft journal, which can occur due to an engagement play of the splined connection, does not influence the quality of the threaded connection. As the friction moment between the axial securing ring and the annular groove is smaller than in the threaded connection, the micro-movements take place between the axial securing ring and the annular groove. The relative rotational micro-movements have thus no influence on the threaded connection, as a result of which the connecting assembly is even more effectively secured against being released. The holding ring, preferably in the form of a union nut, comprises a sleeve portion which, in the mounted condition, axially covers the axial securing ring. The inner cross-section of the holding ring is such that the axial securing ring is prevented from widening. In this way it is ensured that, even under the influence of axial forces, the axial securing ring is held in the annular groove, thus avoiding any unintentional release of the connecting assembly.

According to a second embodiment, the holding ring is provided in the form of a snap ring which is axially held in an inner annular groove of the inner joint part and, respectively, in a component firmly connected to the inner joint part, with the axial securing ring being axially held at least indirectly between the snap ring and the contact face of the inner joint part. At least indirectly means that the snap ring can be directly supported against the axial securing ring or with an intermediate ring being inserted therebetween. In this embodiment with a snap ring, the inner joint part is preferably held with axial play relative to the shaft journal. A relative rotational micro-movement of the inner joint part relative to the shaft journal due to the engagement has no effect on the axial security of the connecting assembly.

The component firmly connected to the inner joint part comprises an inner recess, so that the inner wall axially covers the axial securing ring in the mounted condition. "A firmly connected component" is meant to be a sleeve portion, for example, which is either produced so as to be integral with the inner joint part or can subsequently be connected to same, by welding for instance. Between the sleeve portion and the outer face of the shaft journal there is thus formed an annular chamber in which the axial securing ring and the holding ring are arranged. To that extent, the sleeve portion has a protecting function. The inner cross-section of the sleeve portion of the inner joint part is preferably such that in the slid-on condition the axial securing ring is prevented from widening. It is thus achieved that the axial securing ring can no longer be pressed out of the annular groove as soon as the inner joint part has been slid on to the shaft journal, with the sleeve portion of the inner joint part covering the axial securing ring.

According to a first variant, the holding ring provided in the form of a snap ring is arranged with pretension in the inner annular groove of the sleeve portion of the inner joint part and thus fixes the intermediate ring in the axial direction. For assembly purposes, first the intermediate ring and the axial securing ring are slipped on to the shaft journal. Then, the inner joint part is slid on from the one side against the axial securing ring. Finally, the holding ring is inserted into the annular groove of the inner joint part, so that the inner joint part is supported via the intermediate ring against the holding ring.

According to a second variant, the holding ring which is provided in the form of a snap ring and which is arranged in the inner annular groove of the sleeve portion is designed in such a way that it is pretensioned inwardly and is located with pretension on the shaft journal. For assembly purposes, first the axial securing ring is inserted into the annular groove of the shaft journal. Subsequently, the inner joint part, together with the snap ring inserted into same, is slid on to the shaft journal, with the snap ring being held open by a tool, i.e. it is radially elastically widened. After the inner joint part has stopped against the axial securing ring, the snap ring is released, so that it snaps radially inwardly and is positioned on the shaft journal with pretension. The axial securing ring is thus axially fixed between the snap ring and the stop face of the inner joint part. To prevent the radially inwardly loaded snap ring from being widened unintentionally, it is advantageous to provide a cap which can be slid on to the sleeve portion after the inner joint part has been mounted on the shaft journal. Thus, the radially outwardly bent ends of the snap ring, which serve assembly purposes, are secured, and at the same time, the assembly is protected from any penetrating dirt.

According to another design, which applies to all the above-mentioned embodiments, there are provided shaft splines for connecting the inner joint part on the shaft journal in a rotationally fixed way, with the annular groove containing the axial securing ring axially adjoining the shaft splines. The annular groove is easier to produce because it is not positioned inside the shaft teeth. The inner joint part comprises a ball track portion in which there are formed inner ball tracks, with the shaft splines axially extending over and beyond the ball track portion as far as and into the sleeve portion of the inner joint part. This measure of providing extended shaft splines allows the transmission of particularly high torque values. Furthermore, it is proposed that the inner joint part, in the region of the sleeve portion, comprises an outer annular groove in which there is fixed an inner bead of a sealing member by means of a clamping ring. Prior to being mounted on the shaft journal, the joint designed in this way, can be fully pre-assembled. By using a diaphragm boot as a sealing member, there is achieved a particularly compact construction.

BRIEF DESCRIPTION OF THE DRAWINGS

Embodiments will be described below with reference to the drawing wherein.

DETAILED DESCRIPTION

Figure 1:
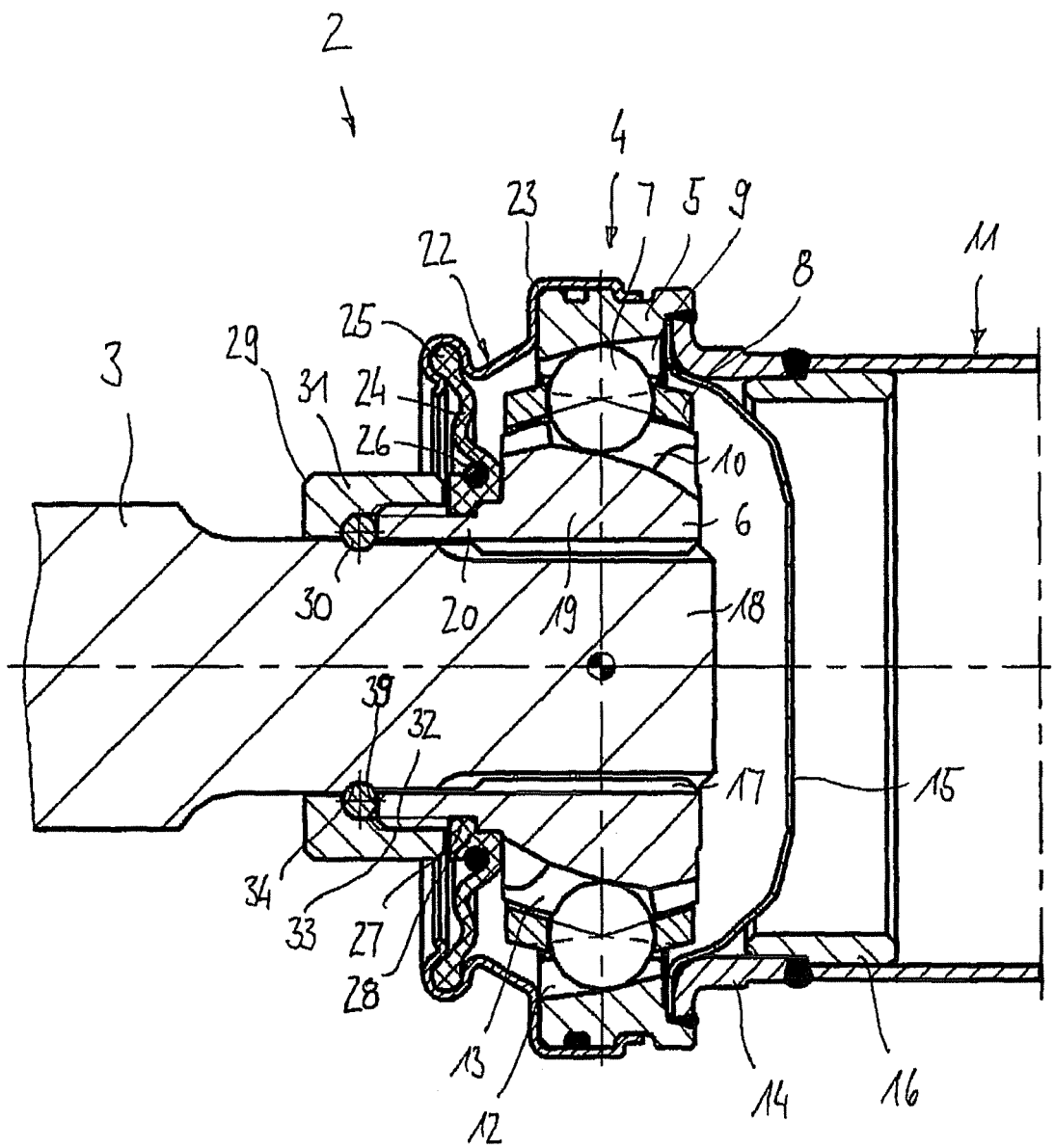
FIG. 1, in a longitudinal section, shows a connecting assembly between a shaft journal and a constant velocity joint in a first embodiment having a union nut.

Initially, the Figures will be described jointly below to the extent that they comprise details which correspond to one another.

The shaft journal 3 is connected to a constant velocity universal joint 4 provided in the form of a fixed counter track joint, to be explained in further detail below. The shaft journal 3 is axially and radially supported by means of a rolling contact bearing in a drive housing (not shown). The drive can be the axle differential of a motor vehicle with a rear axle drive, with the constant velocity universal joint 4 then being arranged at an end of a propeller shaft. To that extent, the shaft journal 3 is axially fixed in the drive housing and cannot be displaced during the final assembly stage of the constant velocity universal joint 4 and the driveshaft connected thereto.

The constant velocity universal joint 4 comprises an outer joint part 5, an inner joint part 6, torque transmitting balls 7 and a ball cage 8. The balls 7 are held in first outer ball tracks 9 and first inner ball tracks 10 which open towards the driveshaft, and in second outer ball tracks 12 and second inner ball tracks 13 which open towards the shaft journal. A hollow shaft 11 is welded to the outer joint part 5. The hollow shaft 11 comprises a shaft tube to whose end there is welded a flange part 14, as well as a reinforcing ring 16 arranged in the region of the weld. Between the flange part 14 of the hollow shaft 11 and the outer joint part 5, there is inserted a cover 15 which seals the joint chamber towards the shaft tube.

On its side arranged opposite the hollow shaft 11, the constant velocity universal joint 4 is sealed by a sealing assembly 22. The sealing assembly 22 comprises a holding element 23 which is fixed to the outer joint part 5, more particularly clipped on to same, as well as a sealing member 24 which, by means of an outer continuous bead 25, sealingly engages a beaded end of the holding ring 23. In its radial inside, the sealing member 24 comprises an inner bead 28 which engages a corresponding annular groove 27 of the inner joint part 6. In this arrangement, the sealing member is provided in the form of a diaphragm boot. For fixing the inner bead 28 on the inner joint part 6, there is provided a securing ring 26, which engages a corresponding annular recess in the outside of the bead 28.

The inner joint part 6 comprises a ball track portion 19 which extends approximately over the length of the inner ball tracks 10, 13, as well as an axially adjoining sleeve portion 20. The continuous annular groove for fixing the sealing member 24 in the sleeve portion 20 is arranged so as to axially adjoin the ball track portion 19.

Below, the special features of the different embodiments will be explained with reference to the connection between the shaft journal 3 and the inner joint part 6.

In the embodiment according to FIG. 1, the connecting assembly 2 comprises an axial securing ring 30 which is provided in the form of a snap ring and which is positioned in a continuous groove 34 of the shaft journal 3. Furthermore, there is provided a holding ring 29 in the form of a union nut which comprises an inner thread 32 by means of which it is threaded on a corresponding outer thread 33 of the sleeve portion 20 of the inner joint part 6. To that extent, the snap ring 30 is axially clamped in between a base portion of the union nut and a contact face 39 of the sleeve portion 20, with the contact face 39 being the end face of the sleeve portion 20.

The inner cross-section of the union nut 29 is dimensioned to be such that the axial securing ring 30 is prevented from being widened. For this purpose, the union nut 29 comprises a sleeve portion with an inner cylindrical face whose inner diameter approximately corresponds to the outer diameter of the snap ring in the inserted condition. In this way, it is ensured that the axial securing ring 30, even under the influence of axial forces during assembly or during operation, is securely held in the annular groove 34.

For assembling the present connecting assembly 2, first the union nut 29, constituting the holding ring, is slid on to the shaft journal 3 and the axial securing ring 30 is inserted into the annular groove 34. Subsequently, the inner joint part 6—and thus the entire constant velocity universal joint 4—is slid on to the shaft journal 3 until the end face 39 of the sleeve portion 20 axially abuts the axial securing ring 30. Subsequently, the union nut 29 is threaded by means of its inner thread 32 on to the outer thread 33 of the sleeve portion 20. In the clamped condition, the connection between the axial securing ring 30 and the union nut 29, and thus the inner joint part 6, is play-free in the axial direction. This is advantageous in that relative micro-movements of the inner joint part 6 relative to the shaft journal 3, due to the engagement play of the shaft splines 17, have no influence on the threaded connection between the union nut 29 and the inner joint part 6.

Figure 2:
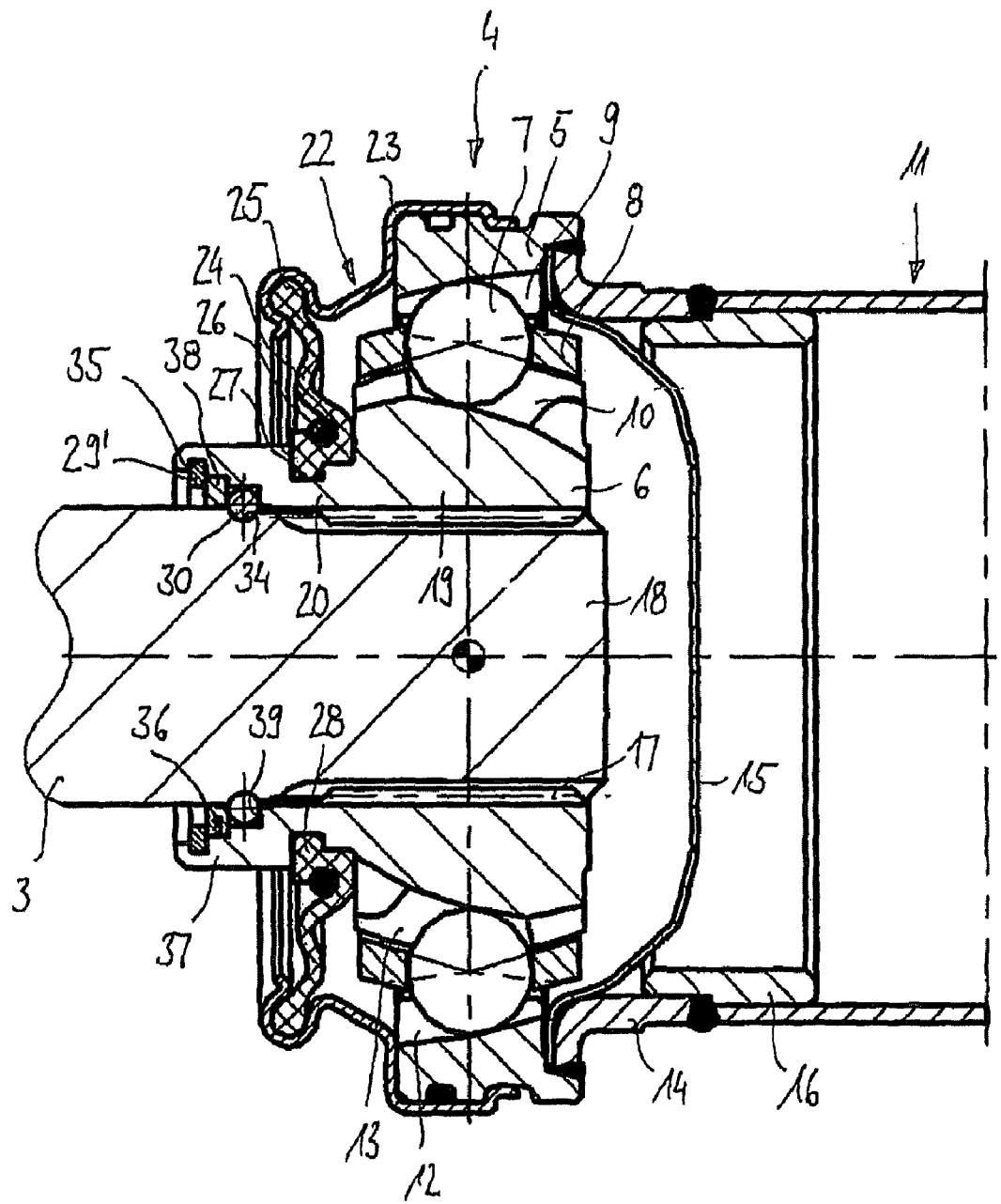
FIG. 2, in a longitudinal section, shows a connecting assembly between a shaft journal and a constant velocity joint in a second embodiment having a snap ring.

In the embodiment shown in FIG. 2, the connecting assembly 2', in addition to the axial securing ring 30 positioned in the annular groove 34, comprises a holding ring 29' which is provided in the form of a snap ring and which is arranged in an inner annular groove 35 of the inner joint part 6. At a free end of the sleeve portion 20', the inner joint part 6 comprises an inner recess 36, so that there is formed an annular chamber between an end portion 37 of the sleeve portion 20 and the outer face of the shaft journal 3. The inner recess 36 comprises a plurality of stepped portions, wherein the inner diameter of the first portion in the region of the axial securing ring 30 corresponds approximately to the outer diameter of the axial securing ring 30. In the axially adjoining second portion with a greater diameter, there is arranged an intermediate ring 38 which, in turn, is axially fixed by the holding ring 29'. The inner cross-section of the end portion 37 is such that the axial securing ring 30 is prevented from widening after the inner joint part 6 has been slid on to the shaft journal 3. In this way, both during assembly and during operation, the axial securing ring 30 is securely held in the annular groove 34, so that, overall, there is achieved a reliable connection. The holding ring 29' is provided in the form of a snap ring which is outwardly pretensioned. The adjoining intermediate ring 38 comprises an outer diameter which is greater than the inner diameter of the snap ring in the inserted condition, as well as an inner diameter which approximately corresponds to the outer diameter of the shaft journal 3.

For assembly purposes, first the securing ring 29' and the intermediate ring 38 are slid on to the shaft journal 3, wherein these is provided a small amount of play between the intermediate ring 38 and the shaft journal. Then the axial securing ring 30 is inserted into the annular groove 34 of the shaft journal 3. Subsequently, the inner joint part 6 and thus the entire constant velocity universal joint 4 is slid on to the shaft journal 3 until the contact face 39 of the sleeve portion 20' comes to rest against the axial securing ring 30, with the contact face 39 being provided in the form of a radial end face of the inner recess 36. Then the intermediate ring 38 is slid from the other end against the axial securing ring 30. Finally, the holding ring 29' provided in the form of a snap ring is inserted into the inner annular groove 35 of the sleeve portion 20'. In this way, the inner joint part 6 is supported via the intermediate ring 38 against the axial securing ring 30. The axial securing ring 30 is arranged with a small amount of axial play between the intermediate ring 38 and the contact face 39.

Figure 3:
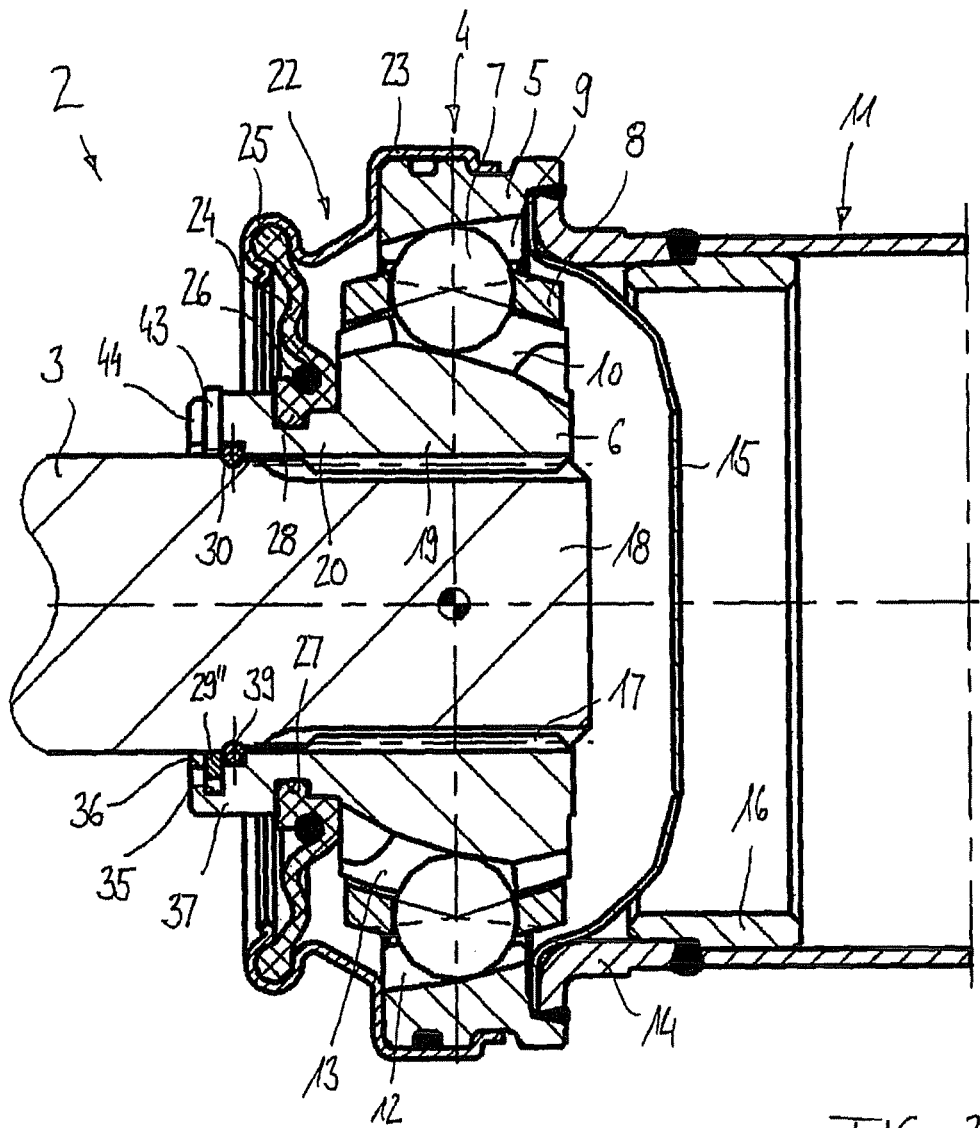
FIG. 3 shows a connecting assembly between a shaft journal and a constant velocity universal joint in a third embodiment having a snap ring:
a) in a longitudinal section and
b) in a cross-section through the snap ring.
Figure 3:
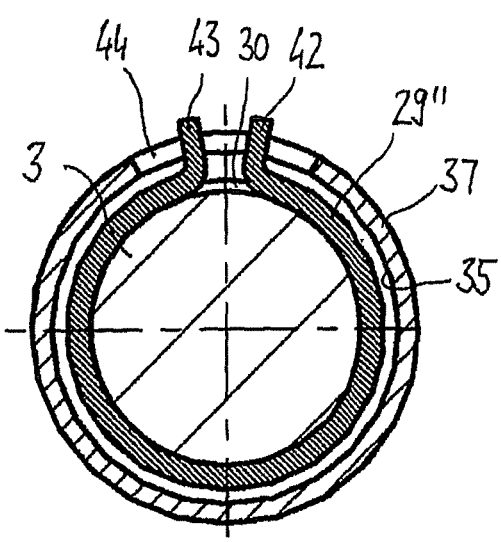

The connecting assembly 2" shown in FIG. 3 is similarly constructed to that illustrated in FIG. 2, so that, as far as common characteristics are concerned, reference can be made to the above description. In this case, too, the inner joint part 6 comprises a sleeve portion 20" with an inner recess 36', which sleeve portion 20" axially covers the axial securing ring 30, thus preventing the latter from widening. In contrast to the above embodiment, the holding ring 29" of the present embodiment is provided in the form of an inwardly resiliently pretensioned snap ring which is shown in an axial view in FIG. 3b. The snap ring 29" is axially fixed in an inner annular groove 35' of the sleeve portion 20", and it is arranged with pretension on the outer face of the shaft journal 3. In this way, the axial securing ring 30 is axially fixed between the snap ring 29" and the contact face 39 of the inner joint part 6. The axial securing ring 30 is prevented from widening by the end portion 37' of the sleeve portion 20" whose inner diameter approximately corresponds to the outer diameter of the axial securing ring in the mounted condition.

For assembly purposes, first the axial securing ring 30 is inserted into the annular groove 34 of the shaft journal 3. Subsequently, the inner joint part 6 and thus the entire constant velocity universal joint 4, together with the pre-mounted snap ring 29", is slid on to the shaft journal 3, with the snap ring 29" being radially outwardly expanded at its ends 42, 43, so that it can be guided over the axial securing ring 30. After the inner joint part 6, by means of its contact face 39, has stopped against the axial securing ring 30, the snap ring 29" is released, so that it snaps radially inwardly and comes to rest on the shaft journal 3 so as to adjoin the axial securing ring 30 with pretension. In this way, the axial securing ring 30 is axially fixed between the snap ring 29" and the contact face 39 of the inner joint part 6. So that the snap ring 29" can be handled by a tool, the sleeve portion 20, in a partial circumferential region, comprises a recess 44 which allows the two ends 42, 43 being held open away from one another.

To prevent the snap ring 29" from being unintentionally released during operation, there can be provided a cap (not shown) which is axially slid on to the sleeve projection 37' and which covers the circumferentially extending recess 44. The cap is slid on to the shaft journal prior to the axial securing ring 30 being inserted into the annular groove 34. In principle, such a cap can also be used for the previously described embodiments.

Figure 4:
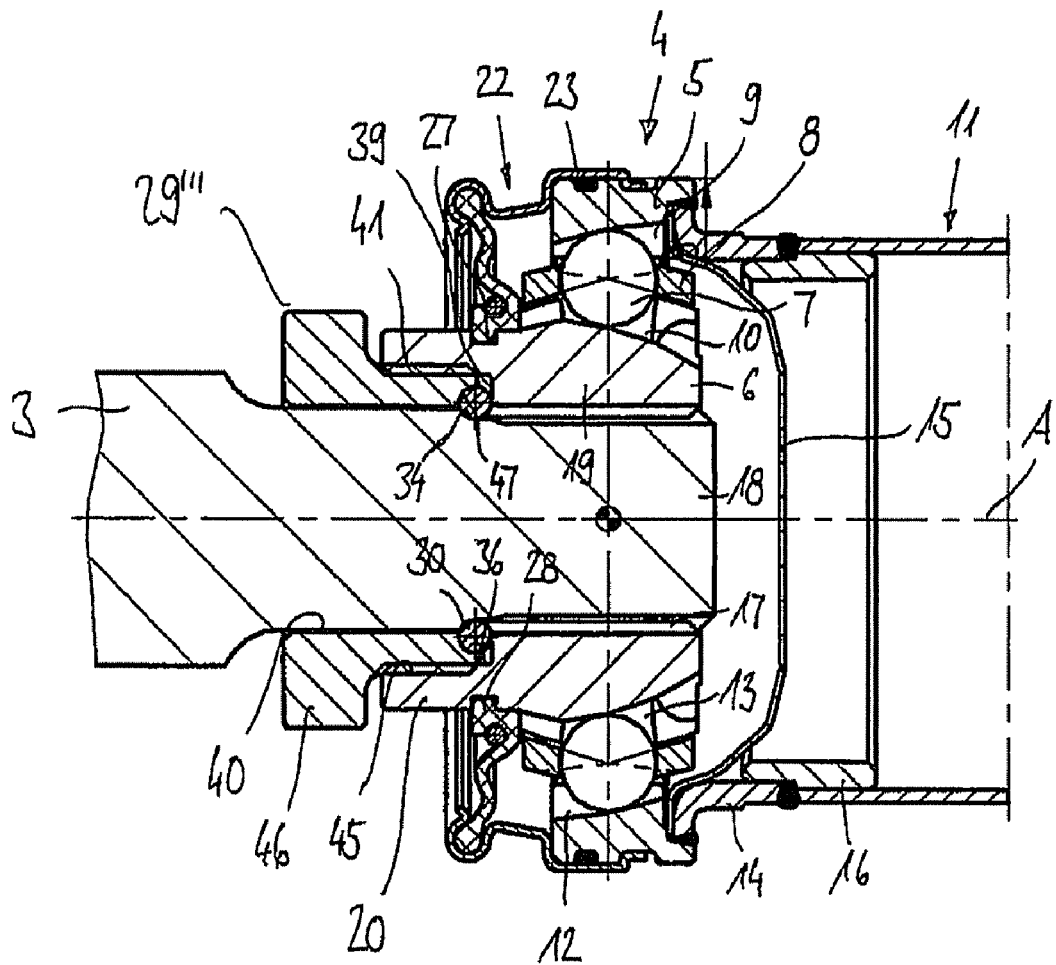
FIG. 4, in a longitudinal section, shows a connecting assembly between a shaft journal and a constant velocity universal joint in a fourth embodiment with a hollow screw.

FIG. 4 shows a further embodiment which is similarly constructed to that shown in FIGS. 2 and 3. To that extent reference can be made to the above description as far as the features are concerned which they have in common. Corresponding components have been given the same reference numbers and any modified components have been given reference numbers with three apostrophes. Below, particular attention will be drawn to the special features of the present embodiment. It can be seen that the holding ring 29''' is provided in the form of a hollow screw which, by means of an internally cylindrical face 40, is rotatably positioned on the shaft journal 3. The hollow screw 29''' comprises a threaded portion with an outer thread 41 which is threaded into a corresponding inner thread 45 of the sleeve portion 20''' of the inner joint part 6. Furthermore, the hollow screw 29''' comprises a force introducing portion 46 for introducing a torque by means of a tool. The axial securing ring 30 is axially clamped in between the end of the hollow screw 29''' and the contact face 39''' of the inner joint part 6, so that the inner joint part 6 and thus the entire joint 4 is axially fixed on the shaft journal 3. The end of the hollow screw 29''' is designed in such a way that the hollow screw 29''' at least partially covers the axial securing ring 30 in its clamped-in condition, thus preventing a radially elastic widening of the axial securing ring 30. The contour of said end portion is adapted to the cross-section of the axial securing ring. In the present embodiment, the end portion comprises a rounded inner recess 47 which contains the axial securing ring 30 with its round cross-section. The contact face 39''' of the inner joint part 6 against which the axial securing ring 30 is supported, is provided in the form of a radial face. Alternatively or in addition to the axial securing ring 30 being partially covered by the end portion of the hollow screw 29''', it is proposed that the inner joint part 6 and, respectively, the sleeve portion 20''', in the region of overlap with the axial securing ring 30, comprise an inner cross-section which prevents axial widening of the axial securing ring 30 (not illustrated).

All the above-mentioned connecting assemblies 2 are advantageous in that they provide a particularly reliable and simply constructed connection between the inner joint part 6 and the shaft journal 3. There is needed only a small number of parts to achieve axial security. Prior to being slid on to the shaft journal 3, the constant velocity universal joint 4 is completely preassembled, which in an advantageous way, keeps the final assembly stage simple with only the connection with the shaft journal having to be effected. This can easily be done by inserting the axial securing ring into the annular groove of the shaft journal, by sliding the inner joint part on the shaft journal and by fixing the holding ring. It is also possible for the unit consisting of the inner joint part, the axial securing ring and the holding ring to be slid on to the journal, with the holding ring permitting the securing ring to be accurately widened into a preassembled condition. Once the axial securing ring has snapped into the journal groove, the holding ring is slid on further, as a result of which the securing ring is prevented from being disconnected. If required, the connecting assembly can be released again, so that the functional ability of the individual components is fully maintained.

Because the axial securing ring 30 is radially secured in all embodiments, the annular groove 34 containing the axial securing ring 30 can comprise a minimum depth, which has an advantageous effect on the strength of the shaft journal 3 because cross-sectional weakening is reduced to a minimum. Indeed, the connecting assembly only has a minimum effect on the strength of the shaft journal because it is possible to use axial securing rings whose shape required only a light reduction on the cross-section of the shaft journal.

Moreover, the above mentioned connecting assemblies achieved secure axial fixing conditions between the inner joint part 6 and the shaft journal 3, which has a positive effect on service life. Further components can be arranged between the holding ring and the contact face of the inner joint part 6. Only a small amount of installation space is required, and the components are easy to mount. The constant velocity universal joint can be completely preassembled, so that, during the final assembly stage, only the connection with the shaft journal has to be effected.

What is claimed is:

1. A connecting assembly for a driveline of a motor vehicle, comprising:
   a shaft journal with an annular groove;
   a constant velocity universal joint with an inner joint part that is rotationally fixed to the shaft journal for transmitting torque;
   an axial securing ring for the inner joint part, wherein the axial securing ring is positioned in the annular groove of the shaft journal; and
   a holding ring for axially fixing the inner joint part to the axial securing ring;
   wherein, in a mounted condition, the holding ring is releasably axially connected to the inner joint part and is axially supported by the axial securing ring, wherein the axial securing ring is arranged axially between a contact face of the inner joint part and a contact face of the holding ring and wherein the axial securing ring is secured against radial widening by the holding ring.

2. A connecting assembly according to claim 1, wherein the axial securing ring is a snap ring that comprises a round profile.

3. A connecting assembly according to claim 1, wherein the holding ring further comprises a sleeve portion that axially covers the axial securing ring in the mounted condition, and wherein an inner cross-section of the holding ring is such that the axial securing ring is prevented from widening.

4. A connecting assembly according to claim 1, wherein the holding ring is a union nut with an inner thread that is threaded onto a corresponding outer thread of the inner joint part, wherein the axial securing ring is axially held between a contact face of the union nut and the contact face of the inner joint part.

5. A connecting assembly according to claim 4, wherein the axial securing ring is held so as to be axially play-free between the contact face of the union nut and the contact face of the inner joint part.

6. A connecting assembly according to claim 1, wherein the annular groove defines a depth and the depth of the annular groove, into which the axial securing ring is inserted, is less than half of a radial extension of the axial securing ring.

7. A connecting assembly according to claim 1, further comprising shaft splines rotationally fixing the inner joint part to the shaft journal and wherein the annular groove, into which the axial securing ring is inserted, axially adjoins the shaft splines.

8. A connecting assembly according to claim 7, wherein the inner joint part further comprises:
   a ball track portion having inner ball tracks formed therein, and
   a sleeve portion,
   wherein splines extend axially beyond the ball track portion into the sleeve portion.

9. A connecting assembly according to claim 8, wherein the inner joint part, in the region of the sleeve portion, comprises an outer annular groove in which there is fixed an inner bead of a sealing.

10. A connecting assembly according to claim 9, whereby the inner bead of the sealing member is fixed within the outer annular groove by a tensioning ring.

11. A connecting assembly according to claim 1, wherein the inner joint part and the holding ring are at least indirectly axially supported by the axial securing ring.

12. A connecting assembly according to claim 11, wherein the inner joint part and the holding ring are axially supported by the axial securing ring in opposite axial directions.

13. A connecting assembly according to claim 12, wherein the holding ring is axially supported by the axial securing ring in direction towards the constant velocity joint, and wherein the inner joint part is axially supported by the axial securing ring in direction towards the holding ring.

14. A connecting assembly according to claim 1, wherein the holding ring is directly connected to the inner joint part so as to be axially fixed relative to the inner joint part.

15. A connecting assembly for a driveline of a motor vehicle, comprising:

a shaft journal with an annular groove; a constant velocity universal joint with an inner joint part that is rotationally fixed to the shaft journal for transmitting torque;

an axial securing ring for the inner joint part, wherein the axial securing ring is positioned in the annular groove of the shaft journal; and a holding ring that is which is positioned on the shaft journal and which is releasably connected directly to the inner joint part;

wherein, when the inner joint part is in a mounted condition, the holding ring is axially supported against the axial securing ring in a first axial direction and the inner joint part is axially supported against the axial securing ring in an opposite second axial direction.

16. A connecting assembly according to claim 15, wherein the inner joint part comprises a sleeve portion that axially covers the axial securing ring in the mounted condition, wherein the inner cross-section of the sleeve portion is such that the axial securing ring is prevented from widening.

17. A connecting assembly according to claim 15, wherein that the holding ring is a snap ring which is positioned in an inner annular groove of a sleeve portion- of the inner joint part, wherein the axial securing ring is axially held between the snap ring and the contact face of the inner joint part.

18. A connecting assembly according to claim 17, wherein the snap ring is outwardly resiliently pretensioned, wherein between the snap ring and the axial securing ring, there is arranged an intermediate ring which is slid onto the shaft journal before the axial securing ring is inserted into the annular groove in the shaft journal.

19. A connecting assembly according to claim 17, wherein the snap ring is inwardly resiliently pretensioned and is positioned with pretension on the shaft journal.

20. A connecting assembly according to claim 15, wherein the holding ring is a hollow screw that is threaded into an inner recess of the inner joint part or into a component fixedly connected with the inner joint part, wherein the axial securing ring is axially held between the hollow screw and the contact face of the inner joint part.

21. A connecting assembly according to claim 20, wherein the axial securing is axially covered by a portion of the hollow screw when the axial securing ring is in the mounted condition, such that the axial securing ring is prevented from widening.

22. A connecting assembly according to claim 15, wherein the axial securing ring is secured against radial widening by at least one of the holding ring, the inner joint part and a member fixedly attached to the inner joint part.

23. A connecting assembly according to claim 15, wherein the holding ring further comprises a sleeve portion that axially covers the axial securing ring in the mounted condition, and wherein an inner cross-section of the holding ring is such that the axial securing ring is prevented from widening.

24. A connecting assembly according to claim 15, wherein the holding ring is a union nut with an inner thread that is threaded onto a corresponding outer thread of the inner joint part, wherein the axial securing ring is axially held between a contact face of the union nut and the contact face of the inner joint part.

* * * * *

UNITED STATES PATENT AND TRADEMARK OFFICE
CERTIFICATE OF CORRECTION

PATENT NO. : 8,070,613 B2
APPLICATION NO. : 12/371219
DATED : December 6, 2011
INVENTOR(S) : Herbert Cermak It is certified that error appears in the above-identified patent and that said Letters Patent is hereby corrected as shown below:

Column 9, line 7, "which is" should be deleted

Colum 9, line 23, portion[[-]] "-" should be deleted

Signed and Sealed this
Twenty-first Day of February, 2012

David J. Kappos
*Director of the United States Patent and Trademark Office*